United States Patent
Shveidel et al.

(10) Patent No.: US 12,073,118 B2
(45) Date of Patent: Aug. 27, 2024

(54) SYSTEM AND METHOD FOR MULTI-NODE STORAGE SYSTEM FLUSHING

(71) Applicant: EMC IP Holding Company, LLC, Hopkinton, MA (US)

(72) Inventors: Vladimir Shveidel, Pardes-Hana (IL); Jibing Dong, Beijing (CN); Geng Han, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 184 days.

(21) Appl. No.: 17/724,915

(22) Filed: Apr. 20, 2022

(65) Prior Publication Data

US 2023/0342079 A1 Oct. 26, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/067* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 2014/0281273 A1* | 9/2014 | Kalekar | G06F 12/0833 711/144 |
| 2019/0213054 A1* | 7/2019 | Mageswaran | G06F 16/182 |
| 2021/0034523 A1* | 2/2021 | Dailey | G06F 3/061 |

* cited by examiner

*Primary Examiner* — Arpan P. Savla
*Assistant Examiner* — Edmund H Kwong
(74) *Attorney, Agent, or Firm* — Brian J. Colandreo; Heath M. Sargeant; Holland & Knight LLP

(57) ABSTRACT

A method, computer program product, and computing system for processing, using a storage node, one or more updates to one or more metadata pages of a multi-node storage system. The one or more updates may be stored in one or more data containers in a cache memory system of the storage node, thus defining an active working set of data containers. Flushing ownership for each data container of the active working set may be assigned to one of the storage nodes based upon an assigned flushing ownership for each data container of a frozen working set and a number of updates within the frozen working set processed by each storage node, thus defining an assigned flushing storage node for each data container of the active working set. The one or more updates may be flushed, using the assigned flushing storage node, to a storage array.

17 Claims, 6 Drawing Sheets

SYSTEM AND METHOD FOR MULTI-NODE STORAGE SYSTEM FLUSHING

BACKGROUND

Storing and safeguarding electronic content may be beneficial in modern business and elsewhere. Accordingly, various methodologies may be employed to protect and distribute such electronic content.

For example, conventional approaches to distributed flushing ownership by multiple storage nodes may allow for independent node flushing through the assignment of particular storage nodes to particular portions of data. However, these approaches are inadequate when the input/output (TO) ingest load on both storage nodes is asymmetric (i.e., storage node A consistently processes more TO requests than storage node B). Storage node A is consistently more loaded with TO ingest, and will also be more loaded with flush work in the same proportion (since flush burden is typically distributed in the same proportionality as TO requests). This mean that storage node A will be overloaded, while storage node B is near idle, and the storage system performance will drop dramatically.

SUMMARY OF DISCLOSURE

In one example implementation, a computer-implemented method executed on a computing device may include, but is not limited to, processing, using a storage node of a plurality of storage nodes, one or more updates to one or more metadata pages of a multi-node storage system. The one or more updates to the one or more metadata pages may be stored in one or more data containers in a cache memory system of the storage node, thus defining an active working set of data containers. Flushing ownership for each data container of the active working set of data containers may be assigned to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers. The one or more updates to the one or more metadata pages may be flushed, using the assigned flushing storage node, from the one or more data containers of the active working set to a storage array.

One or more of the following example features may be included. The plurality of storage nodes include a pair of storage nodes in an active/active configuration with access to the same metadata pages of a storage array. Storing the one or more updates to the one or more metadata pages in one or more data containers in a cache memory system of the storage node may include determining one or more memory addresses associated with the one or more metadata pages; and storing the one or more updates to the one or more metadata pages in one or more data containers within the cache memory system that are associated with the one or more memory addresses of the one or more metadata pages. The active working set of data containers may include a copy of the active working set of data containers in the cache memory system of each storage node, thus defining an active working set of data containers for each storage node, and wherein the frozen working set of data containers may include a copy of the frozen working set of data containers in the cache memory system of each storage node, thus defining a frozen working set of data containers for each storage node. Assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node may include defining a processing balance value for the plurality of storage nodes based upon, at least in part, the number of updates to the one or more metadata pages within the frozen working set processed by each storage node; determining a least utilized storage node of the plurality of storage nodes; and defining a correction factor as a function of the processing balance value.

Assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node may include calculating a hash function for each data container of the active working set based upon, at least in part, an initial memory address of the data container, thus defining a data container hash value for each data container; comparing the data container hash value to the correction factor; in response to the data container hash value being less than the correction factor, assigning flushing ownership for the respective data container to the least utilized storage node; and in response to the data container hash value being greater than or equal to the correction factor, assigning flushing ownership for the respective data container to one of the storage nodes based upon, at least in part, the number of updates to the one or more metadata pages for the particular data container within the frozen working set processed by each storage node. The data container hash value for each data container may be a predefined number of least significant bits of the hash function of the initial memory address of the data container.

In another example implementation, a computer program product resides on a computer readable medium that has a plurality of instructions stored on it. When executed by a processor, the instructions cause the processor to perform operations that may include, but are not limited to, processing, using a storage node of a plurality of storage nodes, one or more updates to one or more metadata pages of a multi-node storage system. The one or more updates to the one or more metadata pages may be stored in one or more data containers in a cache memory system of the storage node, thus defining an active working set of data containers. Flushing ownership for each data container of the active working set of data containers may be assigned to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers. The one or more updates to the one or more metadata pages may be flushed, using the assigned flushing storage node, from the one or more data containers of the active working set to a storage array.

One or more of the following example features may be included. The plurality of storage nodes include a pair of storage nodes in an active/active configuration with access to the same metadata pages of a storage array. Storing the one or more updates to the one or more metadata pages in one or more data containers in a cache memory system of the storage node may include determining one or more memory addresses associated with the one or more metadata pages; and storing the one or more updates to the one or more metadata pages in one or more data containers within the cache memory system that are associated with the one or more memory addresses of the one or more metadata pages. The active working set of data containers may include a copy of the active working set of data containers in the cache memory system of each storage node, thus defining an active working set of data containers for each storage node, and wherein the frozen working set of data containers may include a copy of the frozen working set of data containers in the cache memory system of each storage node, thus defining a frozen working set of data containers for each storage node. Assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node may include defining a processing balance value for the plurality of storage nodes based upon, at least in part, the number of updates to the one or more metadata pages within the frozen working set processed by each storage node; determining a least utilized storage node of the plurality of storage nodes; and defining a correction factor as a function of the processing balance value.

Assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node may include calculating a hash function for each data container of the active working set based upon, at least in part, an initial memory address of the data container, thus defining a data container hash value for each data container; comparing the data container hash value to the correction factor; in response to the data container hash value being less than the correction factor, assigning flushing ownership for the respective data container to the least utilized storage node; and in response to the data container hash value being greater than or equal to the correction factor, assigning flushing ownership for the respective data container to one of the storage nodes based upon, at least in part, the number of updates to the one or more metadata pages for the particular data container within the frozen working set processed by each storage node. The data container hash value for each data container may be a predefined number of least significant bits of the hash function of the initial memory address of the data container.

In another example implementation, a computing system includes at least one processor and at least one memory architecture coupled with the at least one processor, wherein the at least one processor is configured to process, using a storage node of a plurality of storage nodes, one or more updates to one or more metadata pages of a multi-node storage system. The at least one processor may be further configured to store the one or more updates to the one or more metadata pages in one or more data containers in a cache memory system of the storage node, thus defining an active working set of data containers. The at least one processor may be further configured to assign flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers. The at least one processor may be further configured to flush, using the assigned flushing storage node, the one or more updates to the one or more metadata pages from the one or more data containers of the active working set to a storage array.

One or more of the following example features may be included. The plurality of storage nodes include a pair of storage nodes in an active/active configuration with access to the same metadata pages of a storage array. Storing the one or more updates to the one or more metadata pages in one or more data containers in a cache memory system of the storage node may include determining one or more memory addresses associated with the one or more metadata pages; and storing the one or more updates to the one or more metadata pages in one or more data containers within the cache memory system that are associated with the one or more memory addresses of the one or more metadata pages. The active working set of data containers may include a copy of the active working set of data containers in the cache memory system of each storage node, thus defining an active working set of data containers for each storage node, and wherein the frozen working set of data containers may include a copy of the frozen working set of data containers in the cache memory system of each storage node, thus defining a frozen working set of data containers for each storage node. Assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node may include defining a processing balance value for the plurality of storage nodes based upon, at least in part, the number of updates to the one or more metadata pages within the frozen working set processed by each storage node; determining a least utilized storage node of the plurality of storage nodes; and defining a correction factor as a function of the processing balance value.

Assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node may include calculating a hash function for each data container of the active working set based upon, at least in part, an initial memory address of the data container, thus defining a data container hash value for each data container; comparing the data container hash value to the correction factor; in response to the data container hash value being less than the correction factor, assigning flushing ownership for the respective data container to the least utilized storage node; and in response to the data container hash value being greater than or equal to the correction factor, assigning flushing ownership for the respective data container to one of the storage nodes based upon, at least in part, the number of updates to the one or more metadata pages for the particular data container within the frozen working set processed by each storage node. The data container hash value for each data container may be a predefined number of least significant bits of the hash function of the initial memory address of the data container.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
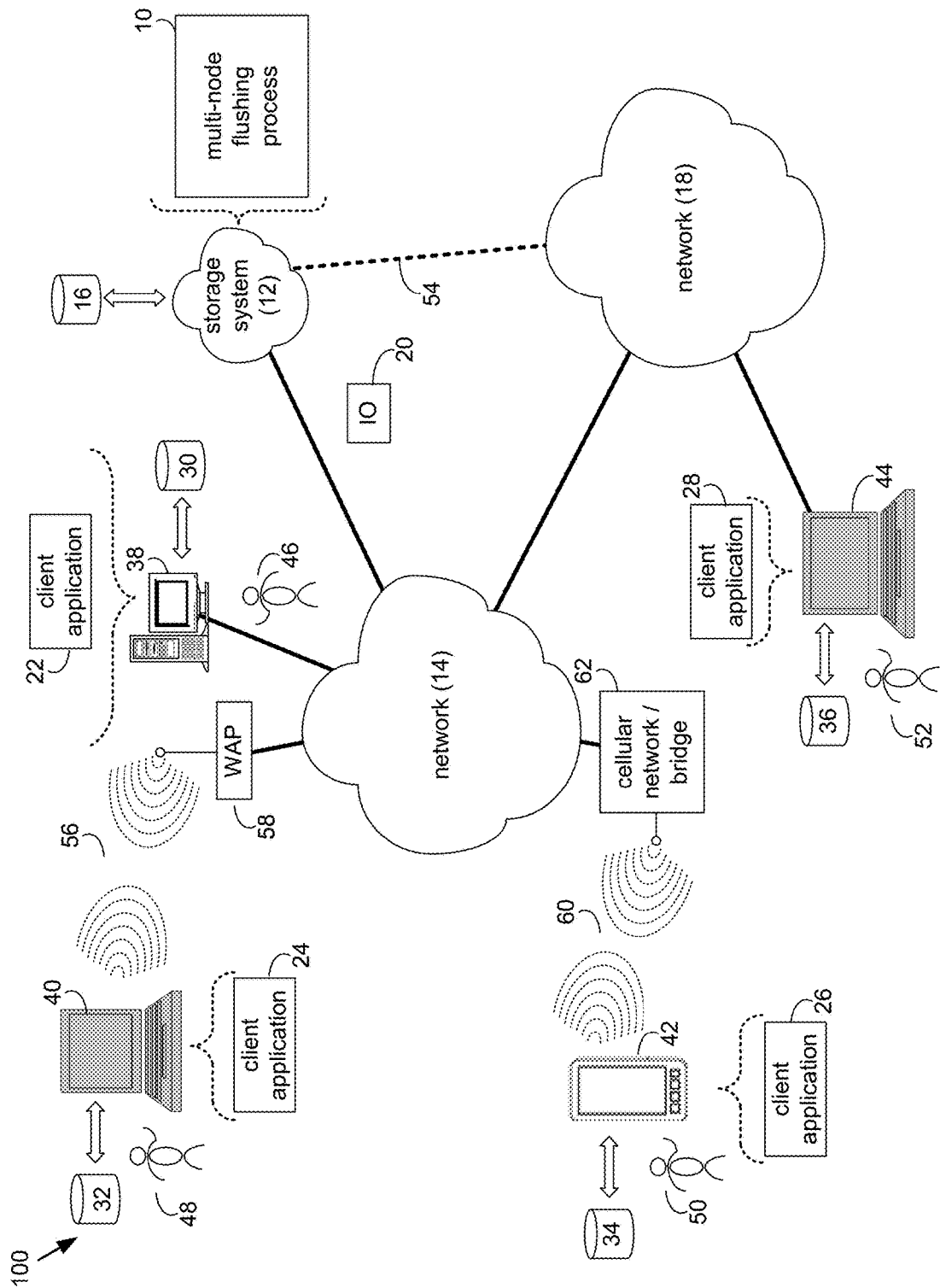
FIG. 1 is an example diagrammatic view of a storage system and a multi-node flushing process coupled to a distributed computing network according to one or more example implementations of the disclosure.

Referring to FIG. 1, there is shown multi-node flushing process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of multi-node flushing process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of multi-node flushing process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a multi-node flushing process, such as multi-node flushing process 10 of FIG. 1, may include but is not limited to, processing, using a storage node of a plurality of storage nodes, one or more updates to one or more metadata pages of a multi-node storage system. The one or more updates to the one or more metadata pages may be stored in one or more data containers in a cache memory system of the storage node, thus defining an active working set of data containers. Flushing ownership for each data container of the active working set of data containers may be assigned to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers. The one or more updates to the one or more metadata pages may be flushed, using the assigned flushing storage node, from the one or more data containers of the active working set to a storage array.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
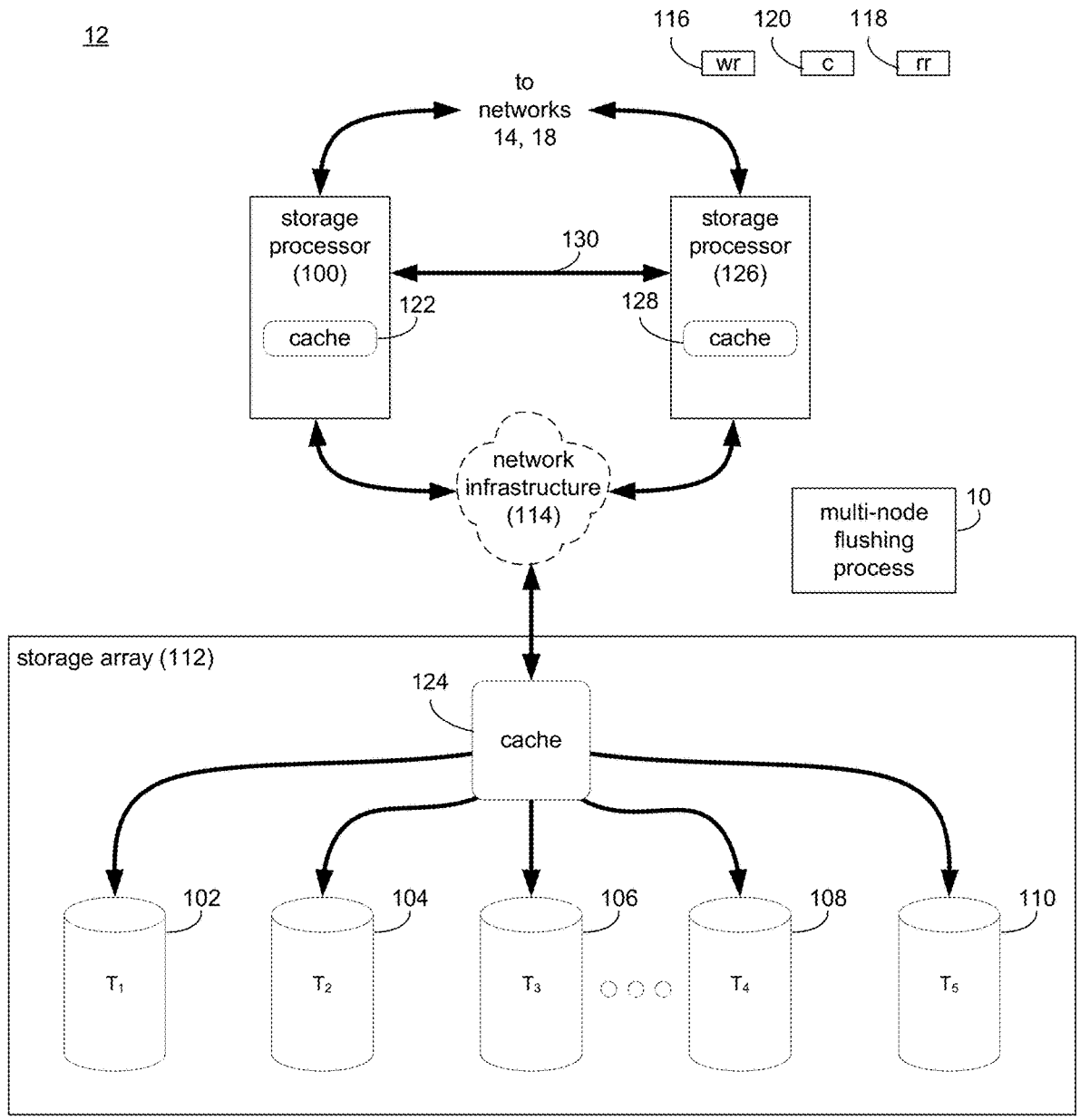
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of multi-node flushing process 10. The instruction sets and subroutines of multi-node flushing process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of multi-node flushing process 10 may be stored on storage devices (and/or executed by processors and memory architectures) that are external to storage system 12.

As discussed above, various TO requests (e.g. TO request 20) may be generated. For example, these TO requests may be sent from client applications 22, 24, 26, 28 to storage system 12. Additionally/alternatively and when storage processor 100 is configured as an application server, these TO requests may be internally generated within storage processor 100. Examples of TO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of multi-node flushing process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of multi-node flushing process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
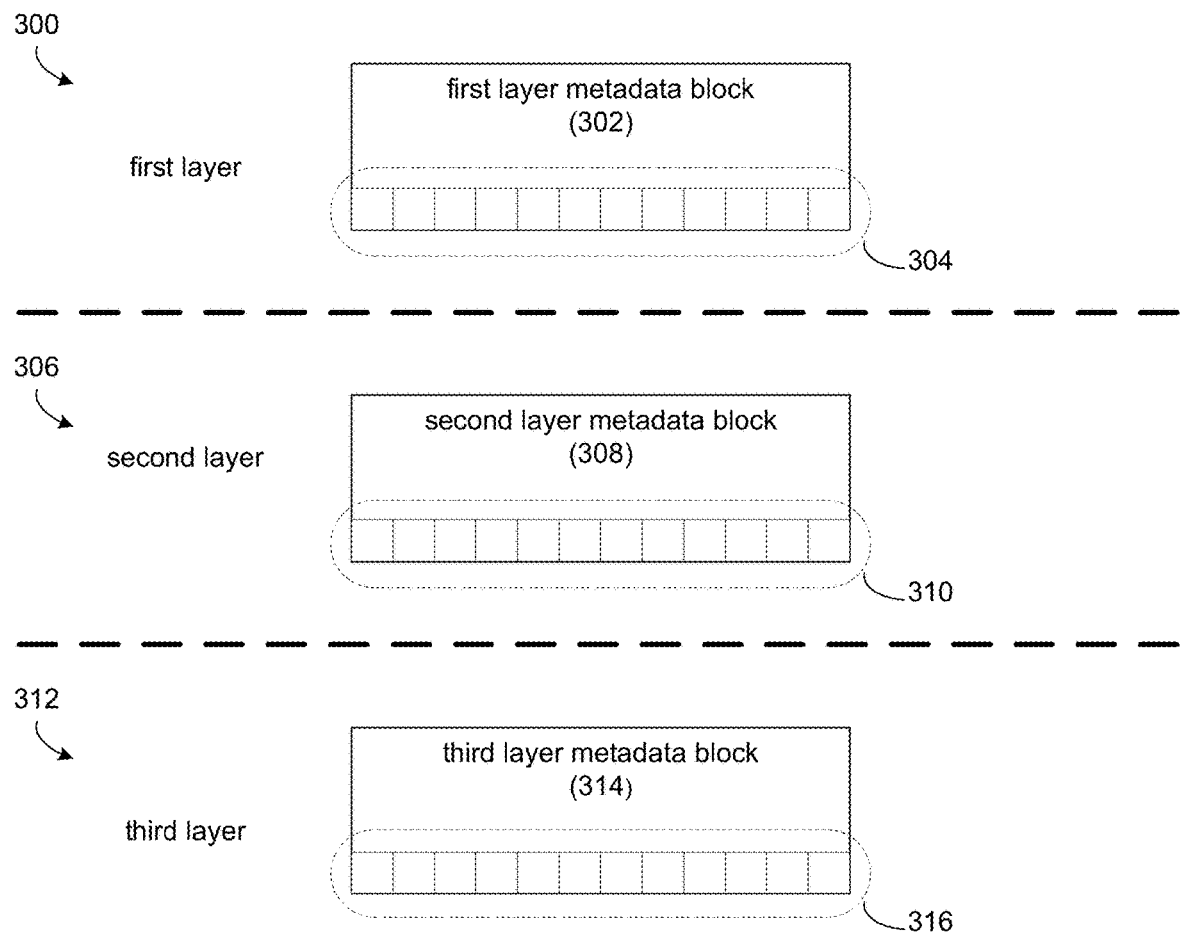

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one. As will be discussed in greater detail below, second layer metadata blocks (e.g., second layer metadata block 308) may be stored in a storage array (e.g., on one of storage targets 102, 104, 106, 108 of storage array 112).

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may have a predefined amount of storage capacity for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

Figure 4:
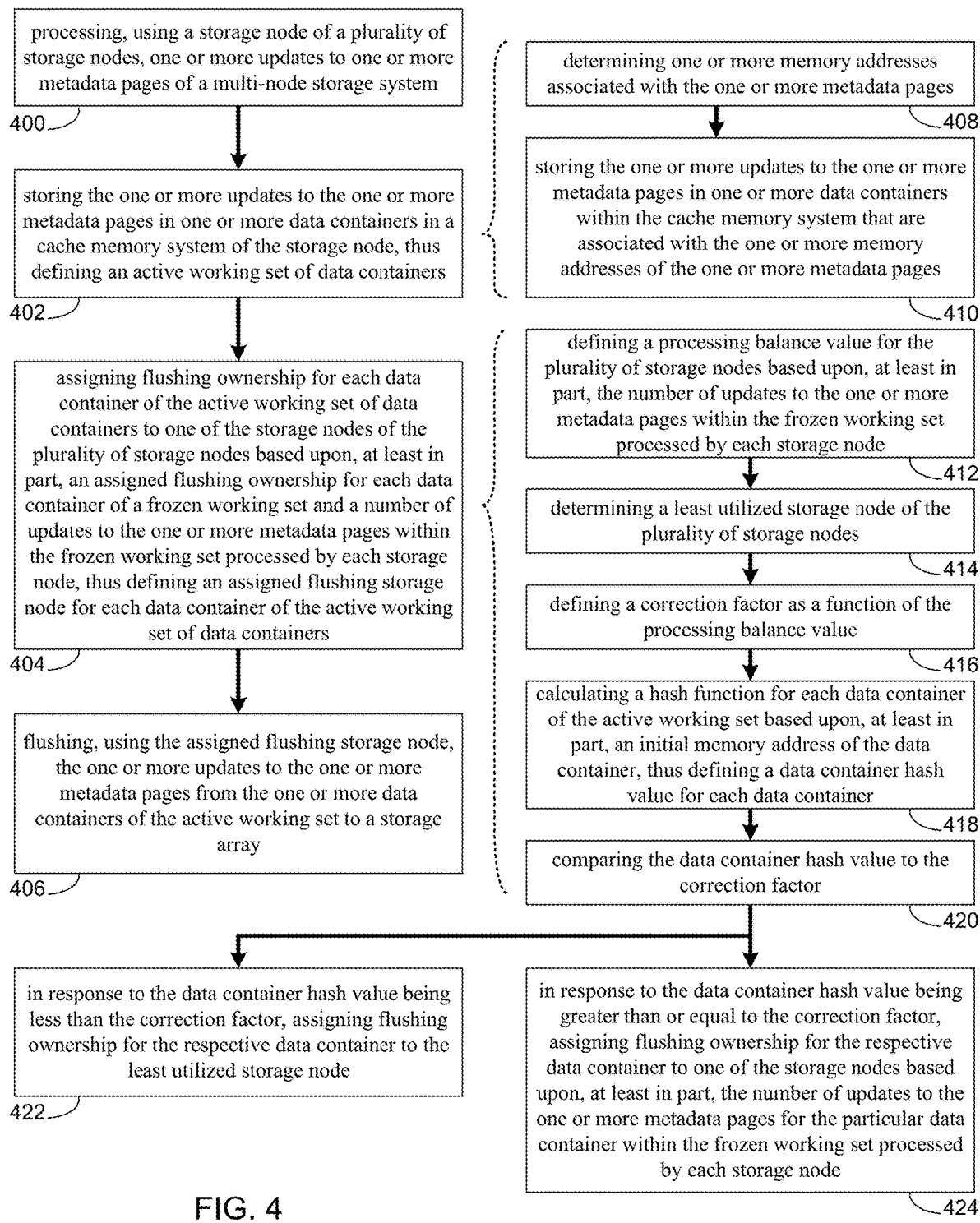
FIG. 4 is an example flowchart of the multi-node flushing process of FIG. 1 according to one or more example implementations of the disclosure.
Figure 5:
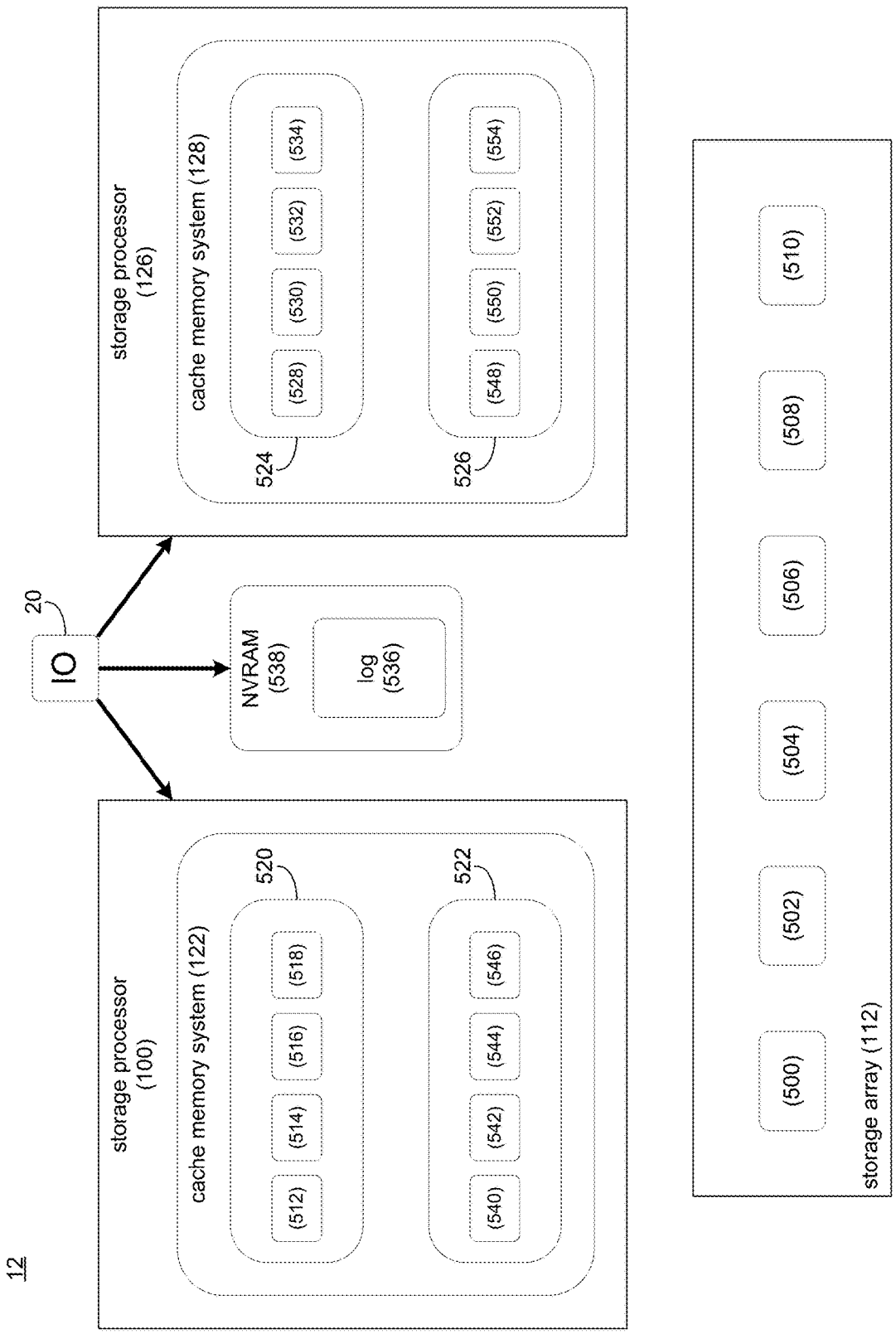
FIGS. 5-6 are example diagrammatic views of the multi-node flushing process of FIG. 1 according to one or more example implementations of the disclosure.
Figure 6:
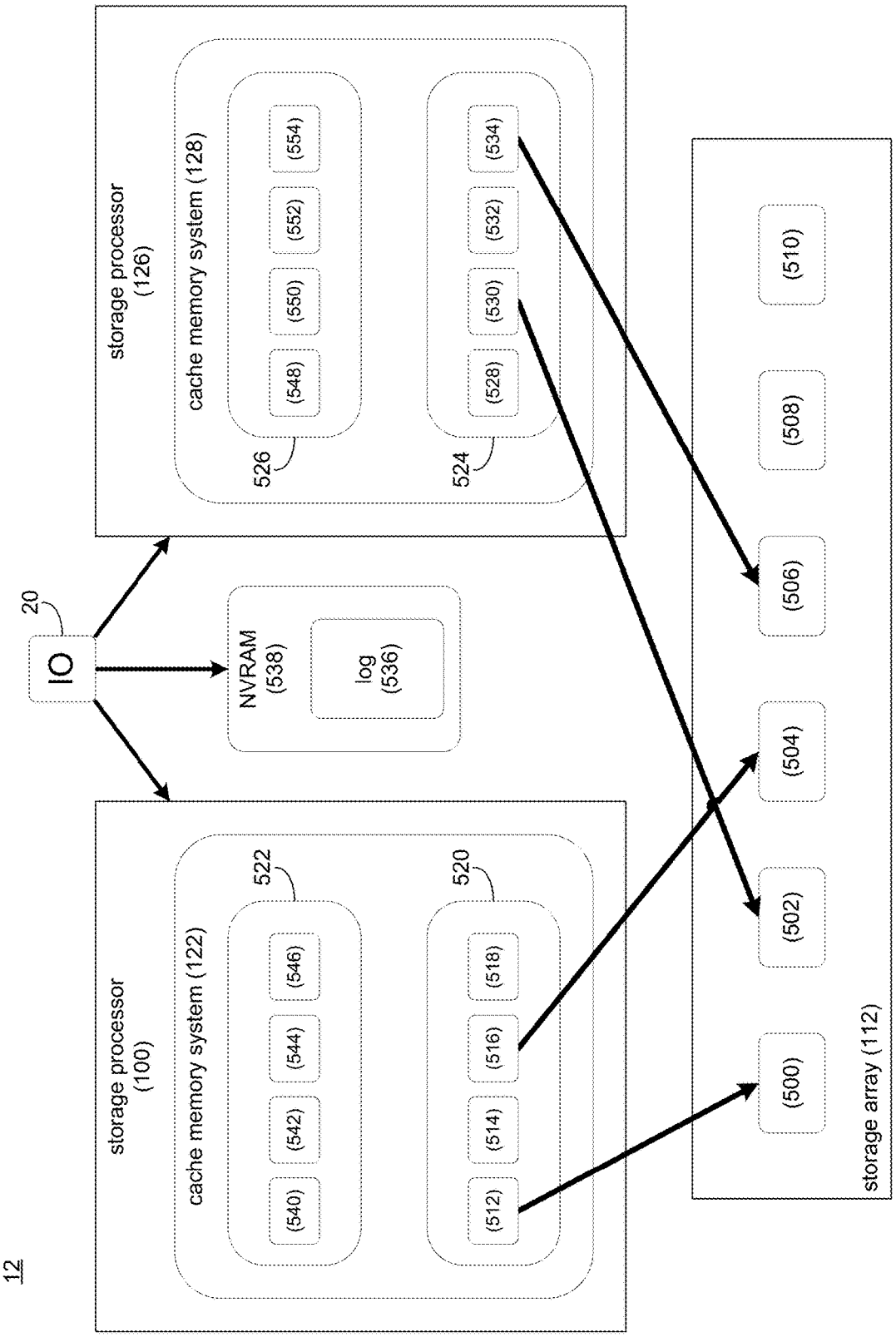

The Multi-Node Flushing Process:

Referring also to FIGS. 4-6 and in some implementations, multi-node flushing process 10 may process 400, using a storage node of a plurality of storage nodes, one or more updates to one or more metadata pages of a multi-node storage system. The one or more updates to the one or more metadata pages may be stored 402 in one or more data containers in a cache memory system of the storage node, thus defining an active working set of data containers. Flushing ownership for each data container of the active working set of data containers may be assigned 404 to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers. The one or more updates to the one or more metadata pages may be flushed 406, using the assigned flushing storage node, from the one or more data containers of the active working set to a storage array.

In some implementations, multi-node flushing process 10 may allow for an "intelligent" ownership assignment protocol, that accounts not just data/cache locality (that are known to both storage nodes at IO ingest/processing time), but also accounts for the current storage nodes' load ratio and allows for dynamic flush ownership distribution. For example, conventional approaches may allow for independent node flushing through the assignment of particular storage nodes to particular portions of data. However, these approaches are inadequate when the IO ingest load on both storage nodes is similar. In such cases, ownership (i.e., flush burden) will be distributed statistically evenly, and this distribution is cache-locality optimized. If the IO ingest load is asymmetric, it is generally more efficient to redistribute the flush burden so that the underutilized node get more flush jobs, even accounting for the fact that the flush operation itself will be more costly on an underutilized storage node since the flushed data is "cache miss" on this storage node.

As will be discussed in greater detail below, implementations of the present disclosure may allow for ownership assignment of particular data containers to be defined dynamically across multiple storage nodes without requiring inter-node communication or coordination. For example and as will be discussed in greater detail below, multi-node flushing process 10 may assign ownership for flushing data containers by particular storage nodes independently while guaranteeing that that assignment is consistent for each storage node. In this manner, ownership assignment may be based upon an invariant mathematical or hash-based operation that is the same for all storage nodes.

In some implementations, multi-node flushing process 10 may process 400, using a storage node of a plurality of storage nodes, one or more updates to one or more metadata pages of a multi-node storage system. A metadata page may generally include a reference to a physical location of user data within a storage array. Referring again to the example of FIG. 3 and in some implementations, a metadata page (e.g., second layer metadata block 308) may encapsulate the physical location of user data and allow relocation without updating first layer metadata blocks (e.g., first layer metadata block 302). Accordingly, the terms "metadata block", "metadata page", and "second layer metadata block" may be used interchangeably throughout the present disclosure.

In some implementations, the plurality of storage nodes may include a pair of storage nodes in an active/active configuration with access to the same metadata pages of a storage array. As discussed above, a multi-node storage system (e.g., storage system 12) may include a pair of storage nodes (e.g., storage processors 100, 126) that are configured in an active/active configuration (i.e., any data received by one storage node is persisted and accessible by another storage node) with access to the same metadata pages of a storage array (e.g., storage array 112). In some implementations, each storage node may be configured to receive and process 400 IO requests for performing IO operations on the data (e.g., metadata pages) of a storage array. The pattern by which each storage node receives and processes 400 IO requests may be unbalanced.

Referring also to FIG. 5, suppose that storage processors 100, 126 are configured in an active/active configuration or cluster with each storage node having access to one or more metadata pages (e.g., metadata pages 500, 502, 504, 506, 508, 510) of storage array 112. In this example, each of storage processors 100, 126 may receive and process 400 IO requests associated with the one or more metadata pages. However, suppose that storage processor 100 processes 400 e.g., 80% of the IO requests received by multi-node storage system 12 and that storage processor 126 processes 400 e.g., 20% of the IO requests received by multi-node storage system 12. In this example, the uneven distribution in IO processing by each storage node may result in unbalanced cache locality of updates to metadata pages.

In some implementations, multi-node flushing process 10 may store 402 the one or more updates to the one or more metadata pages in one or more data containers in a cache memory system of the storage node, thus defining an active working set of data containers. For example, multi-node flushing process 10 may store 402 the one or more metadata deltas in a data container associated with a specific metadata page within a cache memory system of a storage node. For example and as will be discussed in greater detail below, each data container may store one or more updates or deltas associated with a particular metadata page or block. The one or more data containers may be stored in volatile memory. Volatile memory may generally include any temporary memory of a storage system. In one example, the memory may include Random Access Memory (RAM) based storage within a storage processor/node (e.g., cache memory system 122 for storage processor 100 and cache memory system 128 for storage processor 126). RAM-based memory system may include non-persistent RAM-based storage. As is known in the art, non-persistent RAM-based storage is RAM-based storage that will lose its data in the event of e.g., a power failure. However, it will be appreciated that other forms or types of volatile memory may be used within the scope of the present disclosure.

In some implementations, a data container may generally include a data structure for storing one or more metadata changes or metadata deltas. Each data container or bucket of the one or more data containers or buckets may be associated with a particular metadata page. In some implementations, each data container of the one or more data containers may be organized as a binary tree of metadata deltas. For example, upon writing the metadata delta to a specific data container, multi-node flushing process 10 may sort the metadata deltas based upon, at least in part, an insertion order. In other words, each metadata delta may be sorted in the binary tree structure within the data container based on when the metadata delta was received. While a binary tree structure has been described, it will be appreciated that various sorting algorithms or data structures may be used within the scope of the present disclosure.

In some implementations, storing 402 the one or more updates to the one or more metadata pages in one or more data containers in a cache memory system of the storage node may include determining 408 one or more memory addresses associated with the one or more metadata pages; and storing 410 the one or more updates to the one or more metadata pages in one or more data containers within the cache memory system that are associated with the one or more memory addresses of the one or more metadata pages. For example and as discussed above, each metadata page (e.g., metadata page 500, 502, 504, 506, 508, 510) may represent portions of memory within storage array 112. Each metadata page may be defined as an offset and a size (i.e., the initial memory address and amount of memory). For example, metadata page 500 may start at an initial memory address of 0 and may have a size of e.g., 2 gigabytes (GB); metadata page 502 may start at an initial memory address of e.g., 2 GB and may have a size of e.g., 2 GB; metadata page 504 may start at an initial memory address of e.g., 4 GB and may have a size of e.g., 2 GB; metadata page 506 may start at an initial memory address of e.g., 6 GB and may have a size of e.g., 2 GB; metadata page 508 may start at an initial memory address of e.g., 8 GB and may have a size of e.g., 2 GB; and metadata page 510 may start at an initial memory address of e.g., 10 GB and may have a size of e.g., 2 GB. While particular initial memory addresses and sizes have been described, this is for example purposes only. It will be appreciated that metadata pages may have any initial memory address with any size within the scope of the present disclosure.

In some implementations, each data container may be associated with a particular metadata page based upon, at least in part, the memory address of the metadata page. For example, data container 512 may be associated with the memory address associated with metadata page 500; data container 514 may be associated with the memory address associated with metadata page 502; data container 516 may be associated with the memory address associated with metadata page 504; and data container 518 may be associated with the memory address associated with metadata page 506. While this example includes e.g., four data containers (e.g., data containers 512, 514, 516, 518), it will be appreciated that any number of data containers may be utilized corresponding to any number of metadata pages within the scope of the present disclosure.

In this example, suppose that updates associated with metadata pages 500, 502, 504, and 506 are received and processed 400. In this example, multi-node flushing process 10 may determine 408 the memory addresses associated with these updates to determine a corresponding data container to store 410 the one or more updates within the cache memory system. Continuing with the above example, multi-node flushing process 10 may determine 408 that the updates associated with metadata pages 500, 502, 504, 506 have memory addresses corresponding to data containers 512, 514, 516, 518, respectively. Accordingly, multi-node flushing process 10 may store 410 the one or more updates for metadata page 500 to data container 512; the updates for metadata page 502 to data container 514; the updates for metadata page 504 to data container 516; and the updates for metadata page 506 to data container 518.

Each data container may be part of a working set of data containers that may be configured to atomic flushing operations. In other words, each data container of a working set may be flushed in the same operation. In some implementations, a working set of data containers may include one or more data containers corresponding to sequential metadata pages in the storage array. Referring again to FIG. 5 and returning to the above example where storage processor 100 receives one or more updates associated with metadata pages 500, 502, 504, 506, multi-node flushing process 10 may store 402 the one or more updates in cache memory system 122. Specifically, multi-node flushing process 10 may store 402 the one or more updates in one or more data storage containers within one or more working sets of data containers (e.g., working sets 520, 522). In one example, multi-node flushing process 10 may store 402 the one or more updates associated with metadata page 500 in a data storage container associated with metadata page 500 (e.g., data container 512). Additionally, multi-node flushing process 10 may store 402 the one or more updates associated with metadata page 502 in data container 514; the one or more updates associated with metadata page 504 in data container 516; and the one or more updates associated with metadata page 506 in data container 518. As shown in FIG. 5, each of these data containers (e.g., data containers 512, 514, 516, 518) may be a part of working set 520.

In some implementations, multi-node flushing process 10 may store 402 the one or more updates to the one or more metadata pages to an active working set (e.g., active working set 520). An active working set may generally include a working set with one or more data containers (e.g., a data container for each metadata page). In some implementations, each working set may have a predefined storage capacity (e.g., as a portion of the total cache memory system size). Accordingly, when the active working set is full, multi-node flushing process 10 may switch the active working set with an empty working set. This may change the active working set into a "frozen working set" where no changes will be made to the working set during flushing. The now frozen working set may then be flushed to the storage array. As will be discussed in greater detail below, flushing may generally include writing the one or more updates to the one or more metadata pages from a set of data containers to the storage array.

In some implementations, the active working set of data containers may include a copy of the active working set of data containers in the cache memory system of each storage node, thus defining an active working set of data containers for each storage node, and the frozen working set of data containers may include a copy of the frozen working set of data containers in the cache memory system of each storage node, thus defining a frozen working set of data containers for each storage node. For example, as the storage nodes (e.g., storage processors 100, 126) are configured in an active/active configuration, each storage node may include copies of the same active working set (e.g., active working set 520 in cache memory system 122 and active working set 524 in cache memory system 128). Similarly, each storage node may include copies of the same frozen working set (e.g., frozen working set 522 in cache memory system 122 and frozen working set 526 in cache memory system 128). In some implementations, only the processing storage node may store 402 the one or more updates to the one or more metadata pages within its cache memory system. For example, suppose that storage processor 100 processes 400 the one or more updates to metadata pages 500, 502, 504, 506. In this example, multi-node flushing process 10 may store 402 these updates in data containers 512, 514, 516, 518, respectively within active working set 520.

In this example, because storage processor 126 does not process 400 these updates, the updates will not be stored in data containers 528, 530, 532, 534 of active working set 524 that also correspond to metadata pages 500, 502, 504, 506. Data containers 528, 530, 532, 534 of active working set 524 may still access the one or more updates to flush to the one or more updates to the one or more metadata pages. However, when doing so, storage processor 126 may not have a cached copy of the one or more updates and may obtain the one or more updates from another source (e.g., a metadata log). In this manner, each storage node may flush the one or more updates to the one or more metadata pages for a given data container even if the flushing storage node does not have a copy of the one or more updates in its cache memory system.

In some implementations, multi-node flushing process 10 may write the one or more metadata deltas to a metadata log in non-volatile memory. Referring again to the example of FIG. 5 and in some implementations, multi-node flushing process 10 may generate a metadata log (e.g., metadata log 536) in non-volatile memory (e.g., non-volatile Random Access Memory (NVRAM) 538). In some implementations, the metadata log may store metadata deltas in time order (e.g., sorted oldest to newest). In some implementations, the contents of the metadata log may preserved in the event of a power failure or other failure of the cache memory system. In some implementations and in response to the failure of the cache memory system, multi-node flushing process 10 may recover the one or more metadata deltas from the metadata log (e.g., metadata log 536).

In some implementations and in response to destaging or writing the one or more metadata deltas to the storage array (e.g., writing the tablets from the cache memory system to the storage array), multi-node flushing process 10 may release or free the corresponding part of the metadata log (e.g., metadata log 536). In some implementations, multi-node flushing process 10 may determine that the metadata log (e.g., metadata log 536) is full and may write at least a portion of the one or more metadata deltas stored in the metadata log to the storage array (e.g., storage array 112). In some implementations, the at least a portion of the one or more metadata deltas written to the storage array may be stored as e.g., 2 MB chunks in the storage array (e.g., storage array 112). While a 2 MB chunk has been discussed, it will be appreciated that the at least a portion of the one or more metadata deltas may be stored in various chunks or blocks of varying sizes.

In some implementations, multi-node flushing process 10 may assign 404 flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers. For example and as shown in FIG. 5, the one or more data containers may be organized into sets of data containers (e.g., active working sets 520, 524 and frozen working sets 522, 526). In some implementations, multi-node flushing process 10 may assign 404 flushing ownership for each data container of the active working set such that the ownership assignment is consistent across the multi-node storage system (e.g., such that flushing ownership for both data container 512 of storage processor 100 and data container 528 of storage processor 126 is consistent as both of these data containers correspond to the same metadata page (metadata page 500).) Flushing ownership may generally include the responsibility for flushing the one or more updates to the one or more metadata pages from a given data container to the storage array. In this manner, flushing ownership may be assigned 404 on a data container level (e.g., flushing ownership is assigned for each data container). As will be discussed in greater detail below, multi-node flushing process 10 may utilize the characteristics (e.g., flushing ownership assignments and the number of updates processed by each storage node) of a frozen working set to assign 404 flushing ownership for each data container of the active working set (e.g., active working sets 520, 524) to a particular storage node. For example, data container 540 of frozen working set 522 and data container 548 of frozen working set 526 may be associated with metadata page 500. As such, multi-node flushing process 10 may utilize characteristics associated with data container 540 and data container 548 to assign flushing ownership of data container 512 and data container 528 that are also associated with metadata page 500. Similarly, multi-node flushing process 10 may utilize characteristics associated with data container 542 and data container 550 to assign flushing ownership of data container 514 and data container 530 that are associated with metadata page 502; characteristics associated with data container 544 and data container 552 to assign flushing ownership of data container 516 and data container 532 that are associated with metadata page 504; and characteristics associated with data container 546 and data container 554 to assign flushing ownership of data container 518 and data container 534 that are associated with metadata page 506.

Assigning 404 flushing ownership for each data container of the active working set of data containers to one of the storage nodes of the plurality of storage nodes may include defining 412 a processing balance value for the plurality of storage nodes based upon, at least in part, the number of updates to the one or more metadata pages within the frozen working set processed by each storage node; determining 414 a least utilized storage node of the plurality of storage nodes; and defining 416 a correction factor as a function of the processing balance value. For example, multi-node flushing process 10 may operate a counter for each data container for each storage node to count the number of updates ingested or processed by each storage node. In one example, multi-node flushing process 10 may calculate the sum of the number of updates for each data container for the frozen working set for each storage node. For example, multi-node flushing process 10 may generate the sum of the number of updates processed by storage processor 100 for each data container of frozen working set 522 (e.g., data containers 540, 542, 544, 546). Similarly, multi-node flushing process 10 may generate the sum of the number of updates processed by storage processor 126 for each data container of frozen working set 526 (e.g., data containers 548, 550, 552, 554).

With these sums, multi-node flushing process 10 may define 412 a processing balance value. In one example, multi-node flushing process 10 may define 412 the processing balance value as the sum of the number of updates processed by storage processor 100 or "sum of N–100" minus the sum of the number of updates processed by storage processor 126 or "sum of N–126" divided by the sum of "sum of N–100" and "sum of N–126" (e.g., (sum of N–100–sum of N–126)/(sum of N–100+sum of N–126)).

While a specific formula has been described using the sums of the number of updates processed by each storage node, it will be appreciated that this is for example purposes only and that the processing balance value may be determined in various ways within the scope of the present disclosure. For example, various factors and/or performance characteristics (e.g., latency, bandwidth, TOPS, etc.) may be utilized to determine the processing balance value. In some implementations, the processing balance value may be a number ranging from zero to one where a balanced load results in a processing balance value of e.g., zero while a completely imbalanced load results in a processing balance value of e.g., one. As such, the higher or more imbalance, the higher the value of the processing balance value.

Multi-node flushing process 10 may determine 414 a least utilized storage node of the plurality of storage nodes. For example and as discussed above, each storage node may process IO requests and updates to the one or more metadata pages at various rates. As such, each storage node may have distinct levels of utilization. In one example, storage processor 100 may be a primary storage node that processes a majority of the IO requests and updates of the storage system while storage processor 126 may be a secondary or backup storage node that processes a minority of the IO requests and updates of the storage system. In some implementations, determining 414 the least utilized storage node may include comparing the known processing rates of the storage nodes and determining the storage node that processes the fewest IO requests and updates. In some implementations, a selection of a least utilized storage node may be received such that a user can define the least utilized storage node. Accordingly, it will be appreciated that multi-node flushing process 10 may determine a least utilized storage node in various ways within the scope of the present disclosure.

Multi-node flushing process 10 may define 416 a correction factor as a function of the processing balance value. For example, the correction factor may be a value (e.g., a natural number) within a particular range of values that corresponds to the degree of imbalance among the plurality of storage nodes of the multi-node storage system. In one example and as will be discussed in greater detail below, the correction factor may be a value ranging from e.g., zero to e.g., eight where the correction factor relates to the three least significant bits of a data container hash value. In this manner, multi-node flushing process 10 may utilize the correction factor to determine which data containers to assign 404 to which storage node. In some implementations, the correction factor may be determined by each storage node separately such that the calculation of the correction factor is consistent on each storage node. It will be appreciated that various functions or models may be used to define the correction factor from the or based upon the processing balance value.

In some implementations, multi-node flushing process 10 may utilize an imbalance threshold, to allow normal cache-locality optimized distribution when the imbalance is less than the threshold (e.g., to avoid the state when overhead and costs of non-local flushing may exceed gain of balancing). For example, multi-node flushing process 10 may compare the processing balance value to the imbalance threshold. If the processing balance value is less than the imbalance threshold, multi-node flushing process 10 may assign 404 flushing ownership based upon, at least in part, the number of updates to the one or more metadata pages processed by each storage node for the particular data container. For example, if storage processor 100 processes more updates to metadata page 500 than storage processor 126, multi-node flushing process 10 may assign 404 flushing ownership to storage processor 100 to promote cache-locality as storage processor 100 has more updates in cache memory than storage processor 126. If the processing balance value is greater than or equal to the imbalance threshold, multi-node flushing process 10 may continue as described below.

Assigning 404 flushing ownership for each data container of the active working set of data containers to one of the storage nodes of the plurality of storage nodes may include calculating 418 a hash function for each data container of the active working set based upon, at least in part, an initial memory address of the data container, thus defining a data container hash value for each data container; comparing 420 the data container hash value to the correction factor; in response to the data container hash value being less than the correction factor, assigning 422 flushing ownership for the respective data container to the least utilized storage node; and, in response to the data container hash value being greater than or equal to the correction factor, assigning 424 flushing ownership for the respective data container to one of the storage nodes based upon, at least in part, the number of updates to the one or more metadata pages within the frozen working set processed by each storage node. For example and as discussed above, the assignment of flushing ownership is the responsibility of each independent storage node. As will be discussed in greater detail below, when flushing the one or more data containers, multi-node flushing process 10 may assign the flushing ownership first. If the ownership of a given data container is "local" (i.e., within the cache memory system of the flushing storage node), the flushing storage node may flush the data container, otherwise the flushing storage node may skip the data container and leave the flushing to another storage node.

In some implementations, multi-node flushing process 10 may calculate 418 a hash function for each data container of the active working set based upon, at least in part, an initial memory address of the data container, thus defining a data container hash value for each data container. For example, the hash function may include any hash function that can be consistently calculated on each storage node with the same inputs yielding the same outputs. In this manner, each storage node may determine a data container hash value for each data container. For example, multi-node flushing process 10 may calculate the hash function using the first memory address (e.g., LBA) associated with the data container. In some implementations, multi-node flushing process 10 may define a data container hash value for each data container using the result of the hash function. For example, the data container hash value for each data container may be a predefined number of least significant bits of the hash function of the initial memory address of the data container. The predefined number of least significant bits may be a default value (e.g., three), may be a user-defined value, and/or may be determined automatically by multi-node flushing process 10.

In some implementations, multi-node flushing process 10 may compare 420 the data container hash value to the correction factor. For example, if the data container hash value is less than the correction factor, multi-node flushing process 10 may assign 422 flushing ownership for the respective data container to the least utilized storage node. Alternatively, if the data container hash value is greater than or equal to the correction factor, multi-node flushing process 10 may assign 424 flushing ownership for the respective data container to one of the storage nodes based upon, at least in part, the number of updates to the one or more metadata pages processed by each storage node for the particular data container.

For example, suppose that the data container hash value is e.g., the three least significant bits of the hash function of the initial memory address of the data container and that the correction factor ranges between e.g., zero and seven. Suppose for this example, that the correction factor is e.g., four for data containers 540, 542, 544, 546/548, 550, 552, 554 given the imbalance between storage processors 100, 126. When comparing the data container hash value to the correction factor, if the data container hash value is less than e.g., four, multi-node flushing process 10 may assign flushing ownership for the respective data container to the least utilized storage node (e.g., storage processor 126). In this example, suppose that multi-node flushing process 10 determines that the data container hash value for data containers 540, 544 is greater than or equal to e.g., four and that the data container hash values for data containers 550, 554 is less than e.g., four. Multi-node flushing process 10 may assign 422 flushing ownership for data containers 512, 516 to storage processor 100 based upon, at least in part, the number of updates to the one or more metadata pages processed by each storage node for the particular data container (e.g., because data containers 512, 516 and data containers 540, 544 correspond to metadata pages 500, 504, respectively). Additionally, multi-node flushing process 10 may assign 424 flushing ownership for data containers 530, 534 to storage processor 126 as the least utilized storage node (e.g., because data containers 530, 534 and data containers 550, 554 correspond to metadata pages 502, 506, respectively).

In some implementations, multi-node flushing process 10 may flush 406, using the assigned flushing storage node, the one or more updates to the one or more metadata pages from the one or more data containers of the active working set to a storage array. For example and referring also to FIG. 6, when flushing 406 the one or more updates to the one or more metadata pages, multi-node flushing process 10 may "freeze" or otherwise change active working set 520 to frozen working set 520 and active working set 524 to frozen working set 524. In this example, active working sets 520, 524 may be replaced with previously frozen working sets 522, 526. Multi-node flushing process 10 may utilize the assigned flushing ownership to flush 406 data containers 512, 516 using storage node 100 and data containers 550, 554 using storage node 126. In this manner, multi-node flushing process 10 may dynamically adjust flushing ownership assignments to account for imbalance processing by multiple storage nodes and the benefits of cache-locality.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

processing, using a storage node of a plurality of storage nodes, one or more updates to one or more metadata pages of a multi-node storage system;

storing the one or more updates to the one or more metadata pages in one or more data containers in a cache memory system of the storage node, thus defining an active working set of data containers;

assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers, wherein assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node includes:

defining a processing balance value for the plurality of storage nodes based upon, at least in part, the number of updates to the one or more metadata pages within the frozen working set processed by each storage node, determining a least utilized storage node of the plurality of storage nodes, and defining a correction factor as a function of the processing balance value; and flushing, using the assigned flushing storage node, the one or more updates to the one or more metadata pages from the one or more data containers of the active working set to a storage array.

2. The computer-implemented method of claim 1, wherein the plurality of storage nodes include a pair of storage nodes in an active/active configuration with access to the same metadata pages of a storage array.

3. The computer-implemented method of claim 1, wherein storing the one or more updates to the one or more metadata pages in one or more data containers in a cache memory system of the storage node includes:

determining one or more memory addresses associated with the one or more metadata pages; and storing the one or more updates to the one or more metadata pages in one or more data containers within the cache memory system that are associated with the one or more memory addresses of the one or more metadata pages.

4. The computer implemented method of claim 1, wherein the active working set of data containers includes a copy of the active working set of data containers in the cache memory system of each storage node, thus defining an active working set of data containers for each storage node, and wherein the frozen working set of data containers includes a copy of the frozen working set of data containers in the cache memory system of each storage node, thus defining a frozen working set of data containers for each storage node.

5. The computer implemented method of claim 1, wherein assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node includes:

calculating a hash function for each data container of the active working set based upon, at least in part, an initial memory address of the data container, thus defining a data container hash value for each data container;

comparing the data container hash value to the correction factor;

in response to the data container hash value being less than the correction factor, assigning flushing ownership for the respective data container to the least utilized storage node; and in response to the data container hash value being greater than or equal to the correction factor, assigning flushing ownership for the respective data container to one of the storage nodes based upon, at least in part, the number of updates to the one or more metadata pages for the particular data container within the frozen working set processed by each storage node.

6. The computer implemented method of claim 5, wherein the data container hash value for each data container is a predefined number of least significant bits of the hash function of the initial memory address of the data container.

7. A computer program product residing on a non-transitory computer readable medium having a plurality of instructions stored thereon which, when executed by a processor, cause the processor to perform operations comprising:

processing, using a storage node of a plurality of storage nodes, one or more updates to one or more metadata pages of a multi-node storage system;

storing the one or more updates to the one or more metadata pages in one or more data containers in a cache memory system of the storage node, thus defining an active working set of data containers;

assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers, wherein assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node includes: defining a processing balance value for the plurality of storage nodes based upon, at least in part, the number of updates to the one or more metadata pages within the frozen working set processed by each storage node, determining a least utilized storage node of the plurality of storage nodes, and defining a correction factor as a function of the processing balance value; and flushing, using the assigned flushing storage node, the one or more updates to the one or more metadata pages from the one or more data containers of the active working set to a storage array.

8. The computer program product of claim 7, wherein the plurality of storage nodes include a pair of storage nodes in an active/active configuration with access to the same metadata pages of a storage array.

9. The computer program product of claim 7, wherein storing the one or more updates to the one or more metadata pages in one or more data containers in a cache memory system of the storage node includes:
  determining one or more memory addresses associated with the one or more metadata pages; and
  storing the one or more updates to the one or more metadata pages in one or more data containers within the cache memory system that are associated with the one or more memory addresses of the one or more metadata pages.

10. The computer program product of claim 7, wherein the active working set of data containers includes a copy of the active working set of data containers in the cache memory system of each storage node, thus defining an active working set of data containers for each storage node, and wherein the frozen working set of data containers includes a copy of the frozen working set of data containers in the cache memory system of each storage node, thus defining a frozen working set of data containers for each storage node.

11. The computer program product of claim 7, wherein assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node includes:
  calculating a hash function for each data container of the active working set based upon, at least in part, an initial memory address of the data container, thus defining a data container hash value for each data container;
  comparing the data container hash value to the correction factor;
  in response to the data container hash value being less than the correction factor, assigning flushing ownership for the respective data container to the least utilized storage node; and in response to the data container hash value being greater than or equal to the correction factor, assigning flushing ownership for the respective data container to one of the storage nodes based upon, at least in part, the number of updates to the one or more metadata pages for the particular data container within the frozen working set processed by each storage node.

12. The computer program product of claim 11, wherein the data container hash value for each data container is a predefined number of least significant bits of the hash function of the initial memory address of the data container.

13. A computing system comprising:
  a memory; and
  a processor configured to process, using a storage node of a plurality of storage nodes, one or more updates to one or more metadata pages of a multi-node storage system, wherein the processor is further configured to store the one or more updates to the one or more metadata pages in one or more data containers in a cache memory system of the storage node, thus defining an active working set of data containers, wherein the processor is further configured to assign flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node, thus defining an assigned flushing storage node for each data container of the active working set of data containers, wherein assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node includes: defining a processing balance value for the plurality of storage nodes based upon, at least in part, the number of updates to the one or more metadata pages within the frozen working set processed by each storage node, determining a least utilized storage node of the plurality of storage nodes, and defining a correction factor as a function of the processing balance value and wherein the processor is further configured to flush, using the assigned flushing storage node, the one or more updates to the one or more metadata pages from the one or more data containers of the active working set to a storage array.

14. The computing system of claim 13, wherein the plurality of storage nodes include a pair of storage nodes in an active/active configuration with access to the same metadata pages of a storage array.

15. The computing system of claim 13, wherein storing the one or more updates to the one or more metadata pages in one or more data containers in a cache memory system of the storage node includes:
  determining one or more memory addresses associated with the one or more metadata pages; and
  storing the one or more updates to the one or more metadata pages in one or more data containers within the cache memory system that are associated with the one or more memory addresses of the one or more metadata pages.

16. The computing system of claim 13, wherein the active working set of data containers includes a copy of the active working set of data containers in the cache memory system of each storage node, thus defining an active working set of data containers for each storage node, and wherein the frozen working set of data containers includes a copy of the frozen working set of data containers in the cache memory system of each storage node, thus defining a frozen working set of data containers for each storage node.

17. The computing system of claim 13, wherein assigning flushing ownership for each data container of the active working set of data containers to one of the storage nodes of the plurality of storage nodes based upon, at least in part, an assigned flushing ownership for each data container of a frozen working set and a number of updates to the one or more metadata pages within the frozen working set processed by each storage node includes:
  calculating a hash function for each data container of the active working set based upon, at least in part, an initial memory address of the data container, thus defining a data container hash value for each data container;
  comparing the data container hash value to the correction factor;
  in response to the data container hash value being less than the correction factor, assigning flushing ownership for the respective data container to the least utilized storage node; and
  in response to the data container hash value being greater than or equal to the correction factor, assigning flushing ownership for the respective data container to one of the storage nodes based upon, at least in part, the number of updates to the one or more metadata pages for the particular data container within the frozen working set processed by each storage node.

* * * * *